(12) United States Patent
Kimura et al.

(10) Patent No.: US 8,816,031 B2
(45) Date of Patent: Aug. 26, 2014

(54) WATER-SOLUBLE POLYMER AND ADDITIVE FOR PAPER MANUFACTURE

(75) Inventors: Yoshiharu Kimura, Kakogawa (JP); Takahiro Fujiwara, Kakogawa (JP)

(73) Assignee: Harima Chemicals, Inc., Kakogawa-Shi, Hyogo (JP)

(*) Notice: Subject to any disclaimer, the term of this patent is extended or adjusted under 35 U.S.C. 154(b) by 950 days.

(21) Appl. No.: 11/367,487

(22) Filed: Mar. 6, 2006

(65) Prior Publication Data

US 2007/0208143 A1    Sep. 6, 2007

(51) Int. Cl.
| | | |
|---|---|---|
| C08F 20/54 | (2006.01) |
| C08F 20/70 | (2006.01) |
| C08F 120/54 | (2006.01) |
| C08F 2/00 | (2006.01) |
| C08F 2/10 | (2006.01) |
| C08F 220/56 | (2006.01) |
| C08F 220/34 | (2006.01) |
| C08F 222/02 | (2006.01) |
| C08F 220/06 | (2006.01) |
| C08F 230/08 | (2006.01) |

(52) U.S. Cl.
CPC .............. C08F 220/56 (2013.01); C08F 2/001 (2013.01); *C08F 220/34* (2013.01); *C08F 222/02* (2013.01); *C08F 220/06* (2013.01); C08F 2/10 (2013.01); *C08F 230/08* (2013.01)
USPC ......... 526/307.6; 526/303.1; 526/86; 526/79; 526/81; 526/82

(58) Field of Classification Search
USPC ........ 526/303.1, 307.2, 307.6, 86, 79, 81, 82; 525/329.4
See application file for complete search history.

(56) References Cited

U.S. PATENT DOCUMENTS

| | | | | |
|---|---|---|---|---|
| 3,635,915 A | * | 1/1972 | Gale ............................ 524/811 |
| 3,865,686 A | * | 2/1975 | Jursich et al. .............. 162/168.3 |
| 4,103,080 A | * | 7/1978 | Bohmer et al. ................. 526/86 |
| 4,499,212 A | * | 2/1985 | Martino ......................... 523/201 |
| 4,605,702 A | * | 8/1986 | Guerro et al. ................. 525/154 |
| 5,115,065 A | * | 5/1992 | Ogawa et al. ................. 526/304 |
| 5,200,482 A | * | 4/1993 | Gartner ......................... 526/295 |
| 5,438,087 A | * | 8/1995 | Ikeda et al. ................... 524/272 |
| 5,627,249 A | * | 5/1997 | Doki et al. .................. 526/303.1 |
| 5,927,249 A | | 7/1999 | Ackermann et al. |
| 5,942,573 A | | 8/1999 | Doki et al. |
| 6,255,400 B1 | | 7/2001 | Itoh et al. |
| 6,294,622 B1 | * | 9/2001 | Barajas et al. .................. 526/78 |

FOREIGN PATENT DOCUMENTS

| | | | |
|---|---|---|---|
| JP | 60-94697 A | | 5/1985 |
| JP | 63-50597 A | | 3/1988 |
| JP | 03-227485 A | | 10/1991 |
| JP | 05-195485 A | | 8/1993 |
| JP | 05-287693 | * | 11/1993 |
| JP | 05-287693 A | | 11/1993 |
| JP | 05287693 A | * | 11/1993 |
| JP | 07-097790 A | | 4/1995 |
| JP | 08-067715 A | | 3/1996 |
| JP | 11-228641 A | | 8/1999 |
| JP | 2000-212229 | * | 8/2000 |
| JP | 2000-212229 A | | 8/2000 |
| JP | 2000212229 A | * | 8/2000 |
| JP | 2006037290 A | * | 2/2006 |
| WO | 98/06898 A1 | | 2/1998 |
| WO | WO 02/053835 A1 | | 11/2002 |

* cited by examiner

*Primary Examiner* — Irina Krylova
(74) *Attorney, Agent, or Firm* — Sughrue Mion, PLLC

(57) ABSTRACT

The present invention provides a method for preparing a water soluble polymer, which comprises:
a first step of polymerizing:
(a) 60 to 99.5 mol % of at least one selected from acrylamide and methacrylamide,
(b) 0.5 to 20 mol % of at least one selected from α,β-unsaturated monocarboxylic acid, α,β-unsaturated dicarboxylic acid and salts thereof, and (c) 1 to 20 mol % of at least one selected from a water soluble cationic monomer and a salt thereof,
(d) 0.01 to 1 mol % of a chain transfer agent, and
(e) 0.005 to 5 mol % of a crosslinkable monomer,
in the presence of a persulfate-based catalyst to obtain a prepolymer; and
a second step of further adding the persulfate-based catalyst to the prepolymer obtained in the first step and the residual monomer, followed by the polymerization and termination of the polymerization. Consequently, it is made possible to suppress a rapid increase in viscosity during the polymerization thereby to obtain a water soluble branched polymer having high molecular weight and low viscosity.

12 Claims, No Drawings

WATER-SOLUBLE POLYMER AND ADDITIVE FOR PAPER MANUFACTURE

BACKGROUND OF THE INVENTION

1. Field of the Invention

The present invention relates to a stable method for preparing a water soluble branched polymer capable of forming an aqueous solution which has low viscosity in spite of high molecular weight, and use thereof.

2. Description of Related Art

In the fields of coating materials and adhesives, a water soluble polymer having high molecular weight and low viscosity is not only excellent in coating performances, but also excellent in coating film performances. In the field of papermaking additives, a water soluble polymer having high molecular weight and low viscosity is excellent in antifoaming properties and is easy to use, but also excellent in a paper strength enhancing effect. Therefore, it is required to prepare a water soluble polymer capable of forming an aqueous solution which has low viscosity in spite of high molecular weight.

As a part of energy-saving measures and environmental conservation measures, a closed papermaking process, that is, a decrease in displacement has recently made rapid progress. Consequently, the amount of aluminum sulfate (sulfuric acid band), which has conventionally been used, has been limited as a matter of course. Therefore, even when a small or no amount of aluminum sulfate (sulfuric acid band) is added, there has been required to develop a chemical which can exert a sufficient paper-strength effect.

As a paper strength agent which can be used in a wide pH range regardless of whether or not a fixing agent such as aluminum sulfate (sulfuric acid band) is used together with the paper strength agent, for example, Japanese Unexamined Patent Publication (Kokai) No. 60-94697 proposes an amphoteric water soluble copolymer formed from acrylamide, α,β-unsaturated monocarboxylic acid or dicarboxylic acid, and a basic monomer such as dimethylaminoethyl methacrylate.

However, a conventional amphoteric copolymer exerts an insufficient paper strength enhancing effect and it has been required to develop a chemical capable of exerting more excellent effect.

Thus, there has been proposed that, in a (meth)acrylamide-based amphoteric copolymer, a copolymer containing a bifunctional vinyl monomer as a copolymer component is provided and the molecular weight is increased as compared with a copolymer containing no bifunctional vinyl monomer, thereby exerting an excellent paper strength enhancing effect (Japanese Unexamined Patent Publication (Kokai) No. 63-50597).

To further enhance the paper strength enhancing effect, a conventional single stage polymerization method has recently been improved. For example, there are disclosed the following polymerization methods:

(1) a double stage polymerization method in which an acrylamide-based monomer is polymerized in the presence of previously polymerized polyacrylamide (Japanese Unexamined Patent Publication (Kokai) No. 3-227485),
(2) a polymerization method in which a vinyl monomer is added dropwise in the presence of previously polymerized polyacrylamide (Japanese Unexamined Patent Publication (Kokai) No. 5-195485, Japanese Unexamined Patent Publication (Kokai) No. 11-228641 (Specification of U.S. Pat. No. 6,255,400),
(3) a polymerization method in which a first stage polymerization is initiated and, after reaching a specific reaction rate, a monomer is added dropwise (WO2002/053835), and
(4) a polymerization method in which a catalyst is further added to a prepolymer obtained by polymerization (Japanese Unexamined Patent Publication (Kokai) No. 5-287693, Japanese Unexamined Patent Publication (Kokai) No. 2000-212229 and Japanese Unexamined Patent Publication (Kokai) No. 7-97790).

However, the methods (1) and (2) have a drawback such as poor productivity because repolymerization and dropping polymerization must be conducted after previous polymerization. Any of the methods (1) to (4) were not satisfactory methods in view of crosslinking during polymerization, branching process, and control of polymer viscosity after the completion of the polymerization. According to the polymerization methods described above, there is a limitation in an increase of the molecular weight because of rapid thickening during the polymerization and also it is difficult to control molecular weight distribution of a polymer.

When the water soluble polymer is employed as a papermaking additive such as paper strength agents, it is effective to narrow the width of molecular weight distribution so as to obtain high effect in a small addition amount. However, any of the above methods (1) to (4) do not disclose a method for preparing a water soluble branched polymer with narrow molecular weight distribution.

SUMMARY OF THE INVENTION

The present invention provides a method for preparing a water soluble branched polymer having high molecular weight and low viscosity by suppressing a rapid increase in viscosity during the polymerization.

Also the present invention provides a method for preparing a water soluble branched polymer with narrow molecular weight distribution.

The present inventors have intensively studied and found that a water soluble branched polymer having excellent physical properties, which have never been obtained, that is, low viscosity in spite of high molecular weight can be obtained in a stable manner by using a specific chain transfer agent and a specific crosslinking agent and using a multistage polymerization method. Also it has been found that, by controlling the amount of a catalyst in the multistage polymerization method, the contents of a high molecular weight component and a low molecular weight component decrease and thus a water soluble branched polymer with narrow molecular weight distribution is obtained.

The method for preparing a water soluble polymer comprises:

a first step of polymerizing:
(a) 60 to 99.5 mol % of at least one selected from acrylamide and methacrylamide,
a least one selected from (b) 0.5 to 20 mol % of at least one selected from α,β-unsaturated monocarboxylic acid, α,β-unsaturated dicarboxylic acid and salts thereof, and (c) 1 to 20 mol % of at least one selected from a water soluble cationic monomer and a salt thereof,
(d) 0.01 to 1 mol % of a chain transfer agent, and
(e) 0.005 to 5 mol % of a crosslinkable monomer, in the presence of a persulfate-based catalyst to obtain a prepolymer; and
a second step of further adding the persulfate-based catalyst to the prepolymer obtained in the first step and the residual monomer, followed by the polymerization and termination of the polymerization.

The water soluble polymer obtained by the above method of the present invention has a structure having a high degree of branching as compared with a polymer obtained by a conventional method, The method of the present invention suppresses a rapid increase during the polymerization, thus making it possible to increase the molecular weight of the water soluble polymer at low viscosity. An improvement in the molecular weight and structure makes it possible to exert an excellent paper strength enhancing effect and an excellent yield effect required as a papermaking additive. The water soluble polymer is also excellent in long-period storage stability. When a water soluble copolymer is used alone or two or more water soluble polymers each having different polymer composition are used in combination, to more efficiently exert the objective effect, an excellent effect can be exhibited as compared with a conventional polymer.

In the present invention, the amount of the persulfate-based catalyst to be added in the first step is preferably within a range from 0.01 to 0.1% (based on the weight of the monomer). The resulting branched water soluble polymer has increased molecular weight at low viscosity similar to the above water soluble polymer and also the contents of a low molecular weight component and a high molecular weight component (component having very high crosslink density) of the polymer can be decreased, and thus more excellent chemical effect required as a papermaking additive can be exerted.

DESCRIPTION OF PREFERRED EMBODIMENTS

In the present invention, acrylamide and methacrylamide as the component (a) may be used alone or in combination. It is industrially preferable to use acrylamide.

Examples of $\alpha,\beta$-unsaturated monocarboxylic acid as the component (b) include acrylic acid and methacrylic acid, and examples of $\alpha,\beta$-unsaturated dicarboxylic acid include maleic acid, fumaric acid, itaconic acid and citraconic acid. Examples of salts thereof include sodium salt, potassium salt and ammonium salt.

As far as an adverse influence is not exerted on performances, a monomer having a sulfonic acid group may be used in combination. Examples of the monomer having a sulfonic acid group include vinylsulfonic acid, 2-acrylamide-2-methylpropanesulfonic acid, styrenesulfonic acid, 2-acrylamide-2-phenylpropanesulfonic acid, and salts thereof.

Examples of the water soluble cationic monomer as the component (c) include basic monomers having a tertiary amino group, such as dimethylaminoethyl (meth)acrylate, diethylaminoethyl (meth)acrylate, dimethylaminopropyl (meth)acrylate, diethylaminopropyl (meth)acrylate, dimethylaminoethyl (meth)acrylamide, diethylaminoethyl (meth)acrylamide, dimethylaminopropyl (meth)acrylamide and diethylaminopropyl (meth)acrylamide. Examples of salts thereof include salts obtained by adding an inorganic acid or an organic acid, and quaternary ammonium salts obtained by reacting the monomer with a quaternizing agent such as methyl chloride, benzyl chloride, dimethylsulfuric acid, diethylsulfuric acid or epichlorohydrin. As used herein, (meth)acrylate means acrylate or methacrylate, and (meth) acrylamide means acrylamide or methacrylamide.

The monomer composition preferably comprises 60 to 99.5 mol % of the component (a), 0.5 to 20 mol % of the component (b) and 1 to 20 mol % of the component (c), and more preferably 70 to 99 mol % of the component (a), 1 to 15 mol % of the component (b) and 2 to 15 mol % of the component (c). The components (b) and (c) may be used alone or in combination.

In addition to the above three components, a nonionic monomer capable of copolymerizing with the component (a), for example, a hydrophobic monomer such as diacetoneacrylamide, styrene, $\alpha$-methylstyrene, acrylnitrile, methacrylnitrile, methyl (meth)acrylate or vinyl acetate can be introduced as far as water solubility of the copolymer is not adversely affected.

As the chain transfer agent as the component (d), a chain transfer agent, which can easily take a propagating radical of the polymer to be copolymerized away from the above component and exerts low reinitiation effect, is effective and an aqueous chain transfer agent can be used. Examples of the chain transfer agent include mercapto-based chain transfer agents such as mercaptoethanol, thiourea, thioglycolic acid, mercaptopropinonic acid, thiosalicylic acid, thiolactic acid, aminoethanethiol, thioglycerol and thiomalic acid; (meth) allyl-based chain transfer agents such as allyl alcohol, sodium allylsulfonate and sodium methallylsulfonate; and amine-based chain transfer agents such as hydroxyamine, ethanolamine and dimethylamine. Among these chain transfer agents, sodium methallylsulfonate (SMC) and thioglycerol (TGL) are most effective in view of chain transfer efficiency. The amount is preferably within a range from 0.01 to 1 mol % (based on mol of the monomer).

For the crosslinkable monomer as the component (e), there can be used either or both of the following (e-1) and (e-2):

(e-1) a monomer having an active site which can serve as a crosslinking agent, and (e-2) a crosslinkable monomer having plural vinyl groups.

As the component (e-1), a monomer, which has an active site capable of serving as a crosslinking agent and causes the abstraction reaction by an oxidizing agent, is effective and examples thereof include N-substituted (meth)acrylamides such as N,N-dimethyl(meth)acrylamide and N-methyl(meth) acrylamide, vinyltoluene, methyl vinyl ketone and 2-(meth) acryloyloxyethyl acid phosphate. Among these monomers, vinyltoluene (VT) and dimethylacrylamide (DMAM) are particularly effective in view of crosslinking efficiency. The amount is preferably within a range from 0.1 to 5 mol % (based on mol of the monomer).

For the crosslinking agent as component (e-2) which can be used in place of the component (e-1) or used in combination with the component (e), a conventional divinyl monomer having plural double bonds and a trivinyl monomer can be used. Examples of the divinyl monomer include bis(meth) acrylamides such as methylenebis(meth)acrylamide, ethylenebis(meth)acrylamide, hexamethylenebis(meth)acrylamide, bis(meth)acrylamideacetic acid, bis(meth)acrylamide glyoxazol adduct, bis(meth)acrylamidemethylolethylene urea condensate and bis(meth)acrylamidemethylol urea; di(meth)acrylates such as ethylene glycol di(meth)acrylate, diethylene glycol di(meth)acrylate and triethylene glycol (meth)acrylate; divinyl esters such as divinyl adipate and divinyl sebacate; epoxy acrylates; and urethane acrylates.

Examples of the trivinyl monomer include N,N-diallylacrylamide, 1,2,3-triacryloylhexahydro-S-triazine and triallyl isocyanurate, and the amount is within a range from 0.005 to 0.3% (based on mol of the monomer). In addition to the crosslinkable monomers (e-1) and/or (e-2), other reactive monomers can be used alone or in combination with the crosslinkable monomers (e-1) and/or (e-2) as the crosslinkable monomer. Examples of the other reactive monomer include methylolacrylamide, methoxymethylacrylamide, methylolmethacrylamide, ethoxymethylacrylamide and glycidyl methacrylate.

The water soluble polymer is prepared by polymerizing the constituent components (a) to (e) of the water soluble monomer, for example, it is prepared through a first step of adding a chain transfer agent (d) and a crosslinkable monomer (e) to an aqueous mixed solution comprising acrylamide and/or methacrylamide (a), $\alpha,\beta$-unsaturated mono- and/or dicarboxylic acid (b) and/or a water soluble cationic monomer (c) and further adding a catalyst to obtain a prepolymer, and a second step of polymerizing the prepolymer and the residual monomer obtained in the first step using an additional catalyst, and adding a terminator.

The monomer concentration during the polymerization of the first step in the method of the present invention is within a range from 5 to 40% by weight, and preferably from 10 to 30% by weight. The polymerization initiation temperature of the first step is 40° C. or higher, and preferably within a range from 50 to 65° C. After adding an initial catalyst, the temperature rises by heat generation due to heat of polymerization, and the temperature is controlled by external cooling or addition of cooling water so as to control the maximum temperature to 95° C. or lower.

The amount of the residual monomer in the prepolymer obtained in the first step is preferably within a range from 30 to 4 mol % (based on mol of the monomer), and more preferably from about 20 to 5 mol %. At this time, the crosslinking reaction hardly proceeds.

In the second step after the prepolymer was obtained in the first step, after terminating heat generation due to the first stage polymerization, a catalyst is further added and aging is conducted while maintaining at a temperature of 70° C. or higher at which proper decomposition rate of the catalyst is attained, and preferably a temperature within a range from 80 to 93° C. Thereby the polymerization of the residual monomer and the crosslinking reaction are caused and the synthesis of a branched high molecular weight polymer is allowed to proceed. While confirming the viscosity, the catalyst is further added every 30 minutes and the crosslink degree is adjusted when the viscosity is low. When proper viscosity is attained, a terminator is added thereby to terminate the polymerization.

This polymerization method is an efficient and stable polymerization method in which the amount of the residual monomer and the monomer composition are adjusted by adding a portion of monomers when the catalyst is further added, and thus it becomes possible to obtain a polymer having physical properties corresponding to a change in branching degree and purposes and to suppress troubles such as rapid thickening and gelation due to the crosslinking reaction during the polymerization.

Monomers to be added when the catalyst is further added are not specifically limited as long as they are copolymerizable monomers, and the amount is 40 mol % or less, and preferably 30 mol % or less, based on the total amount of the monomer. Monomers are added by a single portion or added dropwise and the addition method is not specifically limited.

Characteristics of finally obtained polymer can be changed by changing the additional monomer composition. Furthermore, it becomes possible to control heat generation during the polymerization, which constitutes a problem when final product concentration is increased, by changing the amount of the additional monomer and addition times.

As the initial catalyst used in the above method, an oxidizing agent used in the radical polymerization or the redox polymerization is effective. For example, persulfate-based catalysts typified by ammonium persulfate (APS) and potassium persulfate (KPS) are generally used in view of performances and cost. Although a redox-based catalyst can also be used, it is necessary to maintain excess conditions of an oxidizing agent where a weight ratio of the reducing agent to the persulfate-based catalyst is ⅓ or less. It is also possible to use the catalyst in combination with radical polymerization initiators such as peroxide, bromate catalyst, perborate catalyst and azo catalyst.

As the catalyst to be added additionally, an oxidizing agent is preferably used alone so as to efficiently proceed the abstraction reaction, and there can be obtained a stable polymerization system in which rapid increase in viscosity is suppressed by adding by several portions.

The amount of the initial catalyst to be used in the first step is within a range from 0.05 to 0.5% by weight based on the weight of the monomer used in the first step. The amount of the additional catalyst used in the second step is within a range from 0.05 to 0.5% by weight based on the total weight of the monomer charged in the first and second steps. The above monomer does not include a crosslinkable monomer. The amounts of the component (d) and the component (e) (that is, the component (e-1) and/or the component (e-2)) as well as the catalyst are preferably adjusted according to balance between four components.

More preferable amounts are as follows:
Component (d): 0.1 to 0.8 mol % (based on mol of the monomer),
Component (e-1): 0.2 to 2 mol % (based on mol of the monomer),
Component (e-2): 0.02 to 0.1 mol % (based on mol of the monomer),
Initial catalyst: 0.1 to 0.3% by weight (based on the weight of the monomer) (which can be used in combination with a reducing agent under excess conditions of an oxidizing agent), and
Additional catalyst: 0.1 to 0.3% by weight (based on the weight of the monomer).

After the polymerization proceeded in the second step until proper polymer viscosity is attained, a terminator is added so as to terminate the polymerization. As the terminator, known chemicals such as a reducing agent for decomposing a persulfate-based catalyst and a polymerization inhibitor for terminating the polymerization can be used alone or in combination. As the terminator, inorganic reducing agents typified by sodium sulfite and sodium hydrogensulfite are preferably used in view of performances and cost. The amount of the terminator is preferably 0.25 to 4 times, more preferably 0.5 to 2 times, larger than the weight of the additional catalyst. Although rapid thickening can be terminated even by lowering the temperature without using the terminator or diluting with water, use of the terminator is effective in view of long-period storage stability.

More referred embodiments of the present invention will now be described. In this embodiment, the amount of the catalyst (initial catalyst) to be added in the first step is within a range from 0.01 to 0.1% by weight based on the total amount of the monomer. As described above, by decreasing the amount of the initial catalyst in the first step wherein the polymer is mainly obtained by the polymerization, formation of a low molecular weight polymer is suppressed and also formation of a partially crosslinked high molecular weight polymer is suppressed. If a large amount of the low molecular weight polymer and the high molecular weight polymer are formed, crosslinking of the partial high molecular weight polymer further proceeds before sufficient crosslinking reaction of the low molecular weight polymer does not proceed in the second step, and thus the viscosity of the product increases rapidly and it can help terminating the reaction. Since the low molecular weight polymer is generally inferior in ability of fixing or flocculating to a pulp, the effect as the papermaking additive may be lowered.

Since the reaction at the initial state of the polymerization may be made unstable by decreasing the initial catalyst concentration, it is preferred to sufficiently decrease the dissolved oxygen concentration in the reaction system. Specifically, the polymerization is preferably conducted under the conditions that the dissolved oxygen concentration in the reaction system is adjusted to 3 ppm or less, and preferably 0.01 to 3 ppm or less, using an inert gas such as nitrogen gas. By decreasing the dissolved oxygen concentration, deactivation of the catalyst is suppressed even when a small amount of the catalyst is used, and thus the catalyst functions efficiently. By suppressing deactivation of a propagating radical due to oxygen, the polymer obtained in the first step has an uniform molecular weight distribution.

In the second step wherein the crosslinking reaction between polymers mainly proceed to form a high molecular weight branched polymer, the entire reaction is allowed to process mildly by decreasing the amount of the catalyst, thereby making it possible to suppress formation of a polymer component having drastically high crosslink density. Specifically, the amount of the additional catalyst (persulfate-based catalyst) to be added in the second step is preferably within a range from 0.01 to 0.1% by weight (based on the weight of the monomer). When the crosslink density is too high, since a functional group, which is ionically adsorbed to the surface of the pulp or forms a hydrogen bond during drying thereby to improve a paper strength, is entrapped into the polymer, the effect as the papermaking additive may be lowered.

In the second step, the additional catalyst is not added immediately after adding an additional monomer, but is added after a fixed time has passed since the addition of the additional monomer. In other words, the additional catalyst is preferably added after heat generation due to polymerization reaction of the additional monomer was nearly completed (about 10 minutes are required under the conditions of 70° C. or higher). Specifically, after the polymerization of the first step, copolymerizable monomers are added in the amount of 40 mol % or less based on the total amount of the monomer added and the polymerization is allowed to proceed. 10 Minutes or more, preferably 10 to 20 minutes after the addition of the monomer, the additional catalyst of the second step is added.

Consequently, since the polymerization of the additional monomer proceeds by the initial catalyst which is slightly remained in the reaction system when the monomer is used, formation of the low molecular weight product is suppressed and also formation of the high molecular weight polymer due to the crosslinking reaction is suppressed until the step before the addition of the additional catalyst.

By allowing to predominantly proceed the reaction, in which the monomer remaining in the system nearly disappears and the molecular weight of the polymer increases by intermolecular crosslinking, in the process after the addition of the additional catalyst, an influence of a difference in a rate of a conventional polymerization reaction (rapid) and that of a crosslinking reaction (slow) can be reduced. As a result, it becomes possible to obtain a polymer having narrow molecular weight distribution.

As described above, by optimizing the amount of the catalyst and the method of using it, a branched polymer which contains a small amount of the low molecular weight component and the high molecular weight component (component having drastically high crosslink density) and has narrow molecular weight distribution, is obtained, and thus it becomes possible to efficiently exert the chemical effect. Others are the same as those in the above embodiment.

Because of its excellent physical properties, the water soluble polymer obtained by the method of the present invention can be suited for use in various applications such as various papermaking additives, for example, paper strength agents, surface coating agents, drainage agents, retention aids, flocculants, water retention agents, dispersing agents and adhesives.

EXAMPLES

The present invention will now be described in detail, but the present invention is not limited to the following examples. Percentages are by weight unless otherwise specified. The monomer composition (mol %) is indicated when the total amount of the monomer (components a to c) added in the first and second steps is 100 mol % unless otherwise specified. The amount of the catalyst is indicated based on the weight of the monomer charged before the addition of the catalyst.

Example 1

In a four-necked flask equipped with a stirrer, a thermometer, a reflux condensing tube and a nitrogen gas introducing tube, 235 g of water, 98.1 g of an aqueous 50% acrylamide solution, 1.5 g of an aqueous 80% acrylic acid solution, 3.8 g of dimethylaminoethyl methacrylate, 0.19 g of vinyltoluene and 0.1 g of sodium methallylsulfonate were charged and, after adjusting the pH to 4.0 with an aqueous 15% sulfuric acid solution, a nitrogen gas was introduced thereby to remove oxygen in the reaction system. After heating to 65° C., 1.7 g (0.16% by weight based on the weight of the monomer) of an aqueous 5% ammonium persulfate solution was added and the polymerization was initiated. Heat generation was terminated by heating to 93° C. and, after 5 minutes, 10 g of 50% acrylamide and 1.7 g (0.14% by weight based on the weight of the monomer) of an aqueous 5% ammonium persulfate solution were added, followed by maintaining at 90° C. for 30 minutes. Furthermore, 1.7 g (0.14% by weight based on the weight of the monomer) of an aqueous 5% ammonium persulfate solution was added, followed by maintaining at 90° C. After 15 minutes, since viscosity began to increase, 1.7 g of an aqueous 5% sodium sulfite solution was added thereby to terminate the polymerization to obtain a stable aqueous copolymer solution having a nonvolatile content of 14.9%, Brookfield viscosity at 25° C. of 33,000 mpa·s and pH4.5. This solution is referred to as a prototype product A-1.

Examples 2 to 38

The polymerization was conducted in the same manner as in Example 1, except that the monomer component, the amount of the crosslinking agent and the amount of the chain transfer agent were changed as described in Table 1 to Table 10. Thereby, prototype products A-2 to E-6 were obtained.

Comparative Example 1 (C1)

In a four-necked flask equipped with a stirrer, a thermometer, a reflux condensing tube and a nitrogen gas introducing tube, 244 g of water, 108.1 g of an aqueous 50% acrylamide solution, 2.1 g of itaconic acid, 3.8 g of dimethylaminoethyl methacrylate, 0.47 g of vinyltoluene and 0.4 g of sodium methallylsulfonate were charged and, after adjusting the pH to 3.5 with an aqueous 15% sulfuric acid solution, a nitrogen gas was introduced thereby to remove oxygen in the reaction system. After heating to 65° C., 4.2 g (0.34% by weight based on the weight of the monomer) of an aqueous 5% ammonium persulfate solution and 2.0 g (0.17% by weight based on the weight of the monomer) of an aqueous 5% sodium sulfite solution were added and the polymerization was initiated. Heat generation was terminated by heating to 95° C. and, followed by maintaining at 90° C. for 30 minutes. The polymerization was terminated to obtain a stable aqueous copolymer solution having a nonvolatile content of 15.4%, Brookfield viscosity at 25° C. of 12,000 mpa·s and pH4.6. This solution is referred to as a prototype product a-1.

Comparative Example 2 (C2)

In a four-necked flask equipped with a stirrer, a thermometer, a reflux condensing tube and a nitrogen gas introducing tube, 247 g of water, 98.1 g of an aqueous 50% acrylamide solution, 1.3 g of an aqueous 80% acrylic acid solution, 3.4 g of dimethylaminoethyl methacrylate and 1 g of isopropyl alcohol were charged and, after adjusting the pH to 3.5 with an aqueous 15% sulfuric acid solution, a nitrogen gas was introduced thereby to remove oxygen in the reaction system. After heating to 65° C., 1.8 g (0.17% by weight based on the weight of the monomer) of an aqueous 5% ammonium persulfate solution was added and the polymerization was initiated. As the polymerization proceeds, thickening occurred and the mixed solution was gelled during the polymerization.

Comparative Example 3 (C3)

According to the same formulation as in Comparative Example 2, except that the amount of the aqueous 5% ammonium persulfate solution increased to 4.8 g (0.45% by weight based on the weight of the monomer), the polymerization was initiated. Then, the polymerization was conducted in the same manner as in Comparative Example 1 to obtain a stable aqueous copolymer solution having a nonvolatile content of 15.2%, Brookfield viscosity at 25° C. of 18,000 mpa·s and pH4.6. This solution is referred to as a prototype product a-2.

Comparative Examples 4 to 19 (C4 to C19)

The polymerization was conducted in the same manner as in Comparative Example 1 or 3, except that the monomer component, the amount of the crosslinking agent and the amount of the chain transfer agent were changed as described in Table 1 to Table 10. Thereby, prototype products a-3 to e-2 were obtained.

Abbreviations in the tables are as follows.
AM: Acrylamide
DM: Dimethylaminoethyl methacrylate
DMC: Quaternized methyl chloride of DM
DMBC: Quaternized benzyl chloride of DM
AA: Acrylic acid
IA: Itaconic acid
MA: Maleic acid
VT: Vinyltoluene
SMS: Sodium methallylsulfonate
APS: Ammonium persulfate
MBAM: Methylenebisacrylamide
BAMA: Bisacrylamideacetic acid
DMAM: Dimethylacrylamide
MVK: Methyl vinyl ketone
TGL: Thioglycerol
IPA: Isopropyl alcohol (Measurement of molecular weight)

A molecular weight and molecular weight distribution of polymers obtained in the examples and comparative examples were measured by the following procedure. Using GPC equipped with TriSEC-302 (three-dimensional detector of differential refractive index/light scattering/differential pressure viscometer) manufactured by Viscotek Co., a column TSK-GEL GMPWXL manufactured by Tosoh Corporation, and OmniSEC ver 2.5 manufactured by Viscotek Co. as an analysis software, a weight average molecular weight (Mw) of each polymer was decided on the basis of a polyethylene oxide standard sample (SE-150).

TABLE 1

| No. | Prototype product No. | Step for preparing | \multicolumn{7}{c|}{Monomer component (mol %)} | Crosslinking monomer (mol %) | Chain transfer agent (mol %) | \multicolumn{2}{c}{Amount of catalyst (% by weight)} |
|---|---|---|---|---|---|---|---|---|---|---|---|---|---|
|   |   |   | AM | DM | DMBC | DMC | AA | IA | MA |   |   | APS | Na$_2$SO$_3$ |
|   |   |   |   |   |   |   |   |   |   | VT | SMS |   |   |
| 1 | A-1 | 1 | 86 | 3 | — | — | 2 | — | — | 0.2 | 0.08 | 0.16 | — |
|   |   | 2 | 9 | — | — | — | — | — | — | — | — | 0.14 | — |
| 2 | A-2 | 1 | 86 | 3 | — | — | 2 | — | — | 0.5 | 0.08 | 0.16 | — |
| 3 | A-3 | 1 | 83 | 3 | — | 2 | — | 2 | 1 | 1 | 0.08 | 0.16 | — |
| 4 | A-4 | 1 | 86 | 3 | — | — | — | 2 | — | 0.2 | 0.16 | 0.16 | — |
| 5 | A-5 | 1 | 83 | 3 | 2 | — | — | 2 | 1 | 1 | 0.24 | 0.16 | — |
| 6 | A-6 | 1 | 82 | 5 | — | — | 4 | — | — | 0.2 | 0.32 | 0.16 | — |
| 7 | A-7 | 1 | 86 | 3 | — | — | — | 2 | — | 0.5 | 0.32 | 0.16 | 0.01 |
| 8 | A-8 | 1 | 86 | 3 | — | — | 2 | — | — | 1 | 0.32 | 0.16 | 0.03 |

(In all the second steps of A-2 to A-8, the same method as A-1 is used.)

|   |   |   |   |   |   |   |   |   |   | VT | SMS |   |   |
|---|---|---|---|---|---|---|---|---|---|---|---|---|---|
| C1 | a-1 | — | 95 | 3 | — | — | — | 2 | — | 0.5 | 0.32 | 0.34 | 0.17 |

|   |   |   |   |   |   |   |   |   |   | VT | IPA |   |   |
|---|---|---|---|---|---|---|---|---|---|---|---|---|---|
| C2 | — | — | 91 | 5 | — | — | 4 | — | — | — | 2.3 | 0.17 | — |
| C3 | a-2 | — | 91 | 5 | — | — | 4 | — | — | — | 2.3 | 0.45 | — |
| C4 | a-3 | — | 91 | 5 | — | — | 4 | — | — | — | 2.3 | 0.34 | 0.17 |
| C5 | a-4 | — | 92 | 3 | 2 | — | — | 2 | 1 | 0.2 | 3 | 0.18 | 0.09 |

|   |   |   |   |   |   |   |   |   |   | VT | SMS |   |   |
|---|---|---|---|---|---|---|---|---|---|---|---|---|---|
| C6 | a-5 | — | 95 | 3 | — | — | — | 2 | — | — | 0.08 | 0.24 | 0.12 |
| C7 | a-6 | — | 91 | 5 | — | — | 4 | — | — | 0.5 | 0.08 | 0.16 | 0.08 |

TABLE 2

| No. | Prototype product No. | Solid content (%) | Viscosity (mPa·s) | Mw (×10000) |
|---|---|---|---|---|
| 1 | A-1 | 14.9 | 33,000 | 235 |
| 2 | A-2 | 15.4 | 30,000 | 241 |
| 3 | A-3 | 15.5 | 25,000 | 232 |
| 4 | A-4 | 14.2 | 4,700 | 242 |
| 5 | A-5 | 15.3 | 10,800 | 238 |
| 6 | A-6 | 14.9 | 600 | 143 |
| 7 | A-7 | 15.8 | 4,200 | 223 |
| 8 | A-8 | 15.5 | 6,300 | 271 |

TABLE 2-continued

| No. | Prototype product No. | Solid content (%) | Viscosity (mPa·s) | Mw (×10000) |
|---|---|---|---|---|
| C1 | a-1 | 15.4 | 12,000 | 87 |
| C3 | a-2 | 15.2 | 18,000 | 69 |
| C4 | a-3 | 15.7 | 6,000 | 65 |
| C5 | a-4 | 15.0 | 94,000 | 114 |
| C6 | a-5 | 15.0 | 36,500 | 94 |
| C7 | a-6 | 14.9 | 100,000 | 133 |

TABLE 3

| No. | Prototype product No. | Step for preparing | AM | DM | DMBC | DMC | AA | IA | MA | Crosslinking monomer (mol %) | Chain transfer agent (mol %) | APS | Na$_2$SO$_3$ |
|---|---|---|---|---|---|---|---|---|---|---|---|---|---|
| | | | | | | | | | | VT | SMS | | |
| 9 | B-1 | 1 | 87 | 3 | — | — | — | 1 | — | 1 | 0.24 | 0.16 | — |
| 10 | B-2 | 1 | 87 | 1 | 2 | — | — | 1 | — | 1 | 0.24 | 0.16 | — |
| 11 | B-3 | 1 | 86 | 1 | 2 | — | 2 | — | — | 1 | 0.32 | 0.16 | — |
| 12 | B-4 | 1 | 86 | 1 | 2 | — | — | 1 | 1 | 1 | 0.32 | 0.16 | — |
| 13 | B-5 | 1 | 85 | 1 | — | 2 | 3 | — | — | 1 | 0.32 | 0.16 | — |
| 14 | B-6 | 1 | 86 | 1 | — | 2 | — | 1 | 1 | 1 | 0.32 | 0.16 | — |
| | | | | | | | | | | DMAM | TGL | | |
| 15 | B-7 | 1 | 84.5 | 3.5 | — | — | 2 | 1 | — | 1 | 0.32 | 0.16 | 0.03 |
| 16 | B-8 | 1 | 84.5 | 3.5 | — | — | 2 | 1 | — | 1 | 0.24 | 0.16 | — |
| 17 | B-9 | 1 | 84.5 | 1.5 | 2 | — | — | 2 | — | 1 | 0.32 | 0.16 | — |

(In all the second steps of B-1 to B-9, the same method as A-1 is used.)

| No. | Prototype product No. | Step for preparing | AM | DM | DMBC | DMC | AA | IA | MA | Crosslinking monomer (mol %) | Chain transfer agent (mol %) | APS | Na$_2$SO$_3$ |
|---|---|---|---|---|---|---|---|---|---|---|---|---|---|
| | | | | | | | | | | DMAM | IPA | | |
| C8 | b-1 | — | 95 | 3 | — | — | 2 | — | — | 0.2 | 3.0 | 0.63 | — |
| C9 | b-2 | — | 93.5 | 3.5 | — | — | 2 | 1 | — | 0.2 | 3.0 | 0.3 | 0.2 |

TABLE 4

| No. | Prototype product No. | Solid content (%) | Viscosity (mPa·s) | Mw (×10000) |
|---|---|---|---|---|
| 9 | B-1 | 14.8 | 4,700 | 292 |
| 10 | B-2 | 15.2 | 3,200 | 275 |
| 11 | B-3 | 15.6 | 2,800 | 253 |
| 12 | B-4 | 15.1 | 3,500 | 270 |
| 13 | B-5 | 15.8 | 4,100 | 283 |
| 14 | B-6 | 15.3 | 4,200 | 289 |
| 15 | B-7 | 15.6 | 3,500 | 273 |
| 16 | B-8 | 15.3 | 4,300 | 258 |
| 17 | B-9 | 15.8 | 4,000 | 290 |
| C8 | b-1 | 15.7 | 100,000 | 197 |
| C9 | b-2 | 14.8 | 13,000 | 186 |

TABLE 5

| No. | Prototype product No. | Step for preparing | AM | DM | DMBC | DMC | AA | IA | MA | Crosslinking monomer (mol %) | Chain transfer agent (mol %) | APS | Na$_2$SO$_3$ |
|---|---|---|---|---|---|---|---|---|---|---|---|---|---|
| | | | | | | | | | | MBAM | SMS | | |
| 18 | C-1 | 1 | 84 | 3 | 1 | — | 2 | 1 | — | 0.04 | 0.08 | 0.16 | — |
| 19 | C-2 | 1 | 84.5 | 3.5 | — | — | 2 | 1 | — | 0.08 | 0.48 | 0.16 | — |
| 20 | C-3 | 1 | 85 | — | 3 | 1 | — | 2 | — | 0.04 | 0.32 | 0.16 | — |

TABLE 5-continued

| | | | | | | | | | | | | |
|---|---|---|---|---|---|---|---|---|---|---|---|---|
| 21 | C-4 | 1 | 84 | 3 | — | 1 | 2 | — | 1 | 0.04 | 0.38 | 0.16 | — |
| 22 | C-5 | 1 | 84 | 1 | 2 | — | 1 | 1 | — | 0.08 | 0.5 | 0.16 | — |

(In all the second steps of C-1 to C-5, the same method as A-1 is used.)

| | | | | | | | | | MBAM | IPA | | |
|---|---|---|---|---|---|---|---|---|---|---|---|---|
| C10 | c-1 | — | 86 | 3 | — | — | 2 | — | — | 0.04 | 3.0 | 0.38 | — |
| C11 | c-2 | — | 86 | 3 | — | — | 1 | 1 | — | 0.08 | 3.0 | 0.52 | — |
| C12 | c-3 | — | 84.5 | 3.5 | — | — | — | 2 | 1 | 0.04 | 2.1 | 0.38 | — |
| C13 | c-4 | — | 87 | 1 | 2 | — | — | 1 | — | 0.08 | 3.0 | 0.52 | — |

TABLE 6

| No. | Prototype product No. | Solid content (%) | Viscosity (mPa·s) | Mw (×10000) |
|---|---|---|---|---|
| 18 | C-1 | 15.7 | 13,500 | 215 |
| 19 | C-2 | 15.3 | 1,800 | 365 |
| 20 | C-3 | 15.3 | 1,500 | 338 |
| 21 | C-4 | 15.7 | 1,200 | 268 |
| 22 | C-5 | 15.2 | 1,000 | 245 |
| C10 | c-1 | 15.7 | 8,000 | 145 |
| C11 | c-2 | 15.3 | 5,500 | 195 |
| C12 | c-3 | 15.2 | 12,000 | 155 |
| C13 | c-4 | 15.5 | 7,000 | 178 |

TABLE 7

| No. | Prototype product No. | Step for preparing | Monomer component (mol %) | | | | | | | Crosslinking monomer (mol %) | Chain transfer agent (mol %) | Amount of catalyst (% by weight) | |
|---|---|---|---|---|---|---|---|---|---|---|---|---|---|
| | | | AM | DM | DMBC | DMC | AA | IA | MA | | | APS | Na$_2$SO$_3$ |
| | | | | | | | | | | DMAM | SMS | | |
| 23 | D-1 | 1 | 86.5 | 3 | — | — | 1.5 | — | — | 0.6 | 0.28 | 0.16 | — |
| 24 | D-2 | 1 | 86 | 1 | 2 | — | 2 | — | — | 1 | 0.28 | 0.16 | — |
| 25 | D-3 | 1 | 86 | 1 | — | 2 | — | 1 | 1 | 1 | 0.28 | 0.16 | 0.03 |
| 26 | D-4 | 1 | 84 | 3 | 2 | — | — | 1 | 1 | 0.5 | 0.56 | 0.16 | — |
| 27 | D-5 | 1 | 87 | 3 | — | — | — | 1 | — | 1 | 0.32 | 0.16 | — |
| 28 | D-6 | 1 | 83 | 3 | — | 2 | — | 2 | 1 | 1.5 | 0.32 | 0.16 | — |
| 29 | D-7 | 1 | 82 | 5 | — | — | 4 | — | — | 2 | 0.32 | 0.16 | — |
| 30 | D-8 | 1 | 86 | 1 | 2 | — | — | 2 | — | 1 | 0.32 | 0.16 | — |
| | | | | | | | | | | MVK | SMS | | |
| 31 | D-9 | 1 | 83 | 3 | — | 2 | — | 2 | 1 | 1 | 0.22 | 0.16 | — |
| 32 | D-10 | 1 | 82 | 5 | — | — | 4 | — | — | 2 | 0.28 | 0.16 | — |

(In all the second steps of D-1 to D-10, the same method as A-1 is used.)

| | | | | | | | | | | IPA | | |
|---|---|---|---|---|---|---|---|---|---|---|---|---|
| C14 | d-1 | — | 96 | 3 | — | — | 1 | — | — | — | 2.1 | 0.22 | 0.11 |
| C15 | d-2 | — | 95 | 1 | 2 | — | 1 | 1 | — | — | 3 | 0.16 | 0.08 |
| | | | | | | | | | | DMAM | IPA | | |
| C16 | d-3 | — | 91 | 5 | — | — | 4 | — | — | 0.2 | 3 | 0.24 | 0.12 |
| C17 | d-4 | — | 92 | 3 | — | 2 | — | 2 | 1 | 0.5 | 2.1 | 0.3 | 0.15 |

TABLE 8

| No. | Prototype product No. | Solid content (%) | Viscosity (mPa·s) | Mw (×10000) |
|---|---|---|---|---|
| 23 | D-1 | 14.8 | 1,000 | 247 |
| 24 | D-2 | 15.5 | 4,700 | 308 |
| 25 | D-3 | 15.8 | 4,400 | 283 |
| 26 | D-4 | 15.1 | 600 | 107 |
| 27 | D-5 | 14.8 | 1,900 | 344 |
| 28 | D-6 | 14.7 | 2,300 | 305 |
| 29 | D-7 | 14.9 | 3,700 | 322 |
| 30 | D-8 | 15.3 | 2,800 | 335 |
| 31 | D-9 | 15.3 | 11,000 | 213 |
| 32 | D-10 | 15.7 | 13,500 | 264 |

TABLE 8-continued

| No. | Prototype product No. | Solid content (%) | Viscosity (mPa·s) | Mw (×10000) |
|---|---|---|---|---|
| C14 | d-1 | 15.6 | 8,500 | 71 |
| C15 | d-2 | 15.4 | 75,000 | 103 |
| C16 | d-3 | 14.9 | 83,000 | 128 |
| C17 | d-4 | 15.2 | 65,000 | 165 |

TABLE 9

| No. | Prototype product No. | Step for preparing | Monomer component (mol %) | | | | | | | Crosslinking monomer (mol %) | Chain transfer agent (mol %) | Amount of catalyst (% by weight) | |
|---|---|---|---|---|---|---|---|---|---|---|---|---|---|
| | | | AM | DM | DMBC | DMC | AA | IA | MA | | | APS | Na₂SO₃ |
| | | | | | | | | | | VT | SMS | | |
| 33 | E-1 | 1 | 92 | 3 | 2 | — | — | 2 | 1 | 1 | 0.08 | 0.16 | — |
| 34 | E-2 | 1 | 91 | 5 | — | — | 3 | — | 1 | 1 | 0.16 | 0.16 | — |
| 35 | E-3 | 1 | 95 | 3 | — | — | — | 1 | 1 | 2 | 0.16 | 0.16 | — |
| | | | | | | | | | | DMAM | SMS | | |
| 36 | E-4 | 1 | 91 | 5 | — | — | 3 | 1 | — | 1 | 0.04 | 0.16 | — |
| 37 | E-5 | 1 | 92 | 3 | — | 2 | — | 2 | 1 | 2 | 0.08 | 0.16 | — |
| 38 | E-6 | 1 | 95 | 3 | — | — | 2 | — | — | 2 | 0.12 | 0.16 | — |

(In all the second steps of E-1 to E-6, the same method as A-1 is used.)

| | | | | | | | | | | DMAM | SMS | | |
|---|---|---|---|---|---|---|---|---|---|---|---|---|---|
| C18 | e-1 | — | 91 | 5 | — | — | 4 | — | — | — | 0.08 | 0.14 | 0.078 |
| | | | | | | | | | | VT | IPA | | |
| C19 | e-2 | — | 92 | 3 | 2 | — | — | 2 | 1 | 1 | 3 | 0.38 | 0.19 |

TABLE 10

| No. | Prototype product No. | Solid content (%) | Viscosity (mPa·s) | Mw (×10000) |
|---|---|---|---|---|
| 33 | E-1 | 15.3 | 9,300 | 263 |
| 34 | E-2 | 15.4 | 4,200 | 204 |
| 35 | E-3 | 15.6 | 12,000 | 275 |
| 36 | E-4 | 15.5 | 5,400 | 230 |
| 37 | E-5 | 15.2 | 7,100 | 268 |
| 38 | E-6 | 14.9 | 2,000 | 197 |
| C18 | e-1 | 15.7 | 1,200 | 64 |
| C19 | e-2 | 15.2 | 6,400 | 121 |

Test Example 1

A wet paper was obtained by adding 2.0% by weight (pH5.5) or 0% by weight (pH6.8) (based on the weight of the dry pulp) of aluminum sulfate (Alum) to a corrugated board waste paper with Canadian Standard Freeness (C.S.F.) of 430 ml, adding 0.3 to 0.9% by weight (based on the weight of the dry pulp) of each of the aqueous polymer solutions, as a paper strength agent, obtained in the examples and comparative examples, stirring them, diluting the mixture so as to adjust the pulp slurry concentration to 0.1%, and making a paper using a hand paper making machine. The resulting wet paper was pressed under a load of 5 kg for 2 minutes in the state of being interposed between filter papers and then dried at 105° C. for 3 minutes using a drum dryer to obtain a handmade paper having a basis weight of 100 g/m². Humidity of the resulting handmade paper was conditioned at 23° C. and 50% RH for 24 hours and then a burst index was measured in accordance with JIS P-8112. Using a handmade paper obtained by adding no paper strength agent as a control, the burst index was measured in the same manner as described above. The test results are shown in Table 11 and Table 12.

TABLE 11

Evaluation for paper strength of prototype products
pH 5.5 (Alum = 2%)

| Prototype product No. | Amount to be added (%) | Burst Index (kgf) | Index |
|---|---|---|---|
| Blank | — | 1.79 | 100 |
| A-1 | 0.3 | 2.27 | 121 |
| | 0.6 | 2.43 | 136 |
| | 0.9 | 2.69 | 150 |
| A-2 | 0.3 | 2.20 | 123 |
| | 0.6 | 2.44 | 136 |
| | 0.9 | 2.68 | 150 |
| A-7 | 0.3 | 2.19 | 122 |
| | 0.6 | 2.53 | 141 |
| | 0.9 | 2.67 | 149 |
| B-4 | 0.3 | 2.22 | 124 |
| | 0.6 | 2.45 | 137 |
| | 0.9 | 2.74 | 153 |
| B-5 | 0.3 | 2.18 | 122 |
| | 0.6 | 2.43 | 136 |
| | 0.9 | 2.65 | 148 |
| B-7 | 0.3 | 2.29 | 128 |
| | 0.6 | 2.47 | 138 |
| | 0.9 | 2.72 | 152 |
| C-2 | 0.3 | 2.24 | 125 |
| | 0.6 | 2.44 | 136 |
| | 0.9 | 2.61 | 146 |
| D-6 | 0.3 | 2.24 | 125 |
| | 0.6 | 2.49 | 139 |
| | 0.9 | 2.70 | 151 |
| D-7 | 0.3 | 2.20 | 123 |
| | 0.6 | 2.42 | 135 |
| | 0.9 | 2.74 | 153 |

TABLE 11-continued

Evaluation for paper strength of prototype products
pH 5.5 (Alum = 2%)

| Prototype product No. | Amount to be added (%) | Burst Index (kgf) | Index |
|---|---|---|---|
| a-1 | 0.3 | 2.09 | 117 |
|  | 0.6 | 2.25 | 126 |
|  | 0.9 | 2.41 | 135 |
| a-3 | 0.3 | 2.01 | 112 |
|  | 0.6 | 2.18 | 122 |
|  | 0.9 | 2.35 | 131 |
| b-2 | 0.3 | 2.11 | 118 |
|  | 0.6 | 2.27 | 127 |
|  | 0.9 | 2.48 | 139 |
| c-3 | 0.3 | 2.13 | 119 |
|  | 0.6 | 2.30 | 128 |
|  | 0.9 | 2.52 | 141 |
| d-3 | 0.3 | 2.12 | 118 |
|  | 0.6 | 2.32 | 130 |
|  | 0.9 | 2.54 | 142 |

TABLE 12

Evaluation for paper strength of prototype products
pH 6.8 (Alum = 0%)

| Prototype product | Amount to be added (%) | Burst Index (kgf) | Index |
|---|---|---|---|
| Blank | — | 1.96 | 100 |
| A-3 | 0.3 | 2.26 | 115 |
|  | 0.6 | 2.43 | 124 |
|  | 0.9 | 2.54 | 130 |
| A-5 | 0.3 | 2.23 | 114 |
|  | 0.6 | 2.37 | 121 |
|  | 0.9 | 2.57 | 131 |
| B-1 | 0.3 | 2.20 | 112 |
|  | 0.6 | 2.43 | 124 |
|  | 0.9 | 2.61 | 133 |
| B-2 | 0.3 | 2.23 | 114 |
|  | 0.6 | 2.43 | 124 |
|  | 0.9 | 2.59 | 132 |
| B-3 | 0.3 | 2.19 | 112 |
|  | 0.6 | 2.49 | 127 |
|  | 0.9 | 2.63 | 134 |
| C-3 | 0.3 | 2.21 | 113 |
|  | 0.6 | 2.44 | 124 |
|  | 0.9 | 2.65 | 135 |
| D-1 | 0.3 | 2.21 | 113 |
|  | 0.6 | 2.47 | 126 |
|  | 0.9 | 2.61 | 133 |
| D-4 | 0.3 | 2.23 | 114 |
|  | 0.6 | 2.43 | 124 |
|  | 0.9 | 2.57 | 131 |
| a-2 | 0.3 | 2.09 | 107 |
|  | 0.6 | 2.28 | 116 |
|  | 0.9 | 2.37 | 121 |
| b-1 | 0.3 | 2.13 | 109 |
|  | 0.6 | 2.30 | 117 |
|  | 0.9 | 2.39 | 122 |
| c-4 | 0.3 | 2.06 | 105 |
|  | 0.6 | 2.25 | 115 |
|  | 0.9 | 2.34 | 119 |
| d-1 | 0.3 | 2.13 | 109 |
|  | 0.6 | 2.33 | 119 |
|  | 0.9 | 2.42 | 123 |

Example 39

In a four-necked flask equipped with a stirrer, a thermometer, a reflux condensing tube and a nitrogen gas introducing tube, 384 g of deionized water, 118 g of an aqueous 50% acrylamide solution, 4.72 g of dimethylaminoethyl methacrylate, 3.46 g of an aqueous 60% methacryloyoxyethyltrimethylammonium chloride solution, 1.16 g of maleic acid, 1.80 g of an aqueous 80% acrylic acid solution, 0.03 g of methylenebisacrylamide and 0.22 g of sodium methallylsulfonate were charged and, after adjusting the pH to 3.5 with an aqueous 15% sulfuric acid solution, a nitrogen gas was introduced thereby to decrease the dissolved oxygen concentration in the reaction system to 4.0 ppm. After heating to 61° C., 1.4 g (0.1% by weight based on the weight of the monomer) of an aqueous 5% ammonium persulfate solution and 0.3 g (0.02% by weight based on the weight of the monomer) of an aqueous 5% sodium sulfite solution were added and the polymerization was initiated. Heat generation was terminated by heating to 93° C. and 14.2 g of an aqueous 50% acrylamide solution was added and, after 20 minutes, 1.6 g (0.1% by weight based on the weight of the monomer) of an aqueous 5% ammonium persulfate solution were-added, followed by maintaining at 85° C. or higher for 30 minutes. Furthermore, 1.6 g (0.1% by weight based on the weight of the monomer) of an aqueous 5% ammonium persulfate solution was added, followed by maintaining at 85° C. or higher. After 15 minutes, since viscosity began to increase, 3 g of an aqueous 5% sodium sulfite solution was added thereby to terminate the polymerization to obtain a stable aqueous copolymer solution having a nonvolatile content of 15.2%, Brookfield viscosity at 25° C. of 3,900 mPa·s and pH4.5. This solution is referred to as a prototype product F-1.

Examples 40, 41, 43, 44 and 46

The polymerization was conducted in the same manner as in Example 39, except that the constituent monomer component, the amount of the crosslinking agent, the amount of the chain transfer agent and the amount of the catalyst were changed as described in Table 13. Thereby, prototype products F-2, F-3, F-5, F-6 and F-8 were obtained.

Example 42

In a four-necked flask equipped with a stirrer, a thermometer, a reflux condensing tube and a nitrogen gas introducing tube, 304 g of deionized water, 121 g of an aqueous 50% acrylamide solution, 1.89 g of dimethylaminoethyl methacrylate, 5.67 g of an aqueous 60% methacryloyloxyethylbenzyldimethylammonium chloride solution, 2.79 g of maleic acid, 0.04 g of methylenebisacrylamide and 0.85 g of sodium methallylsulfonate were charged and, after adjusting the pH to 3.5 with an aqueous 15% sulfuric acid solution, a nitrogen gas was introduced thereby to decrease the dissolved oxygen concentration in the reaction system to 0.8 ppm. After heating to 63° C., 1 g (0.07% by weight based on the weight of the monomer) of an aqueous 5% ammonium persulfate solution was added and the polymerization was initiated. Heat generation was terminated by heating to 93° C. and 42.7 g of an aqueous 50% acrylamide solution, 1.89 g of dimethylaminoethyl methacrylate and 5.67 g of an aqueous 60% methacryloyloxyethylbenzyldimethylammonium chloride solution were added thereby allowing the polymerization to proceed. After 20 minutes, 1 g (0.05% by weight based on the weight of the monomer) of an aqueous 5% ammonium persulfate solution were added, followed by maintaining at 85° C. or higher for 30 minutes. Furthermore, 1 g (0.05% by weight based on the weight of the monomer) of an aqueous 5% ammonium persulfate solution was added, followed by maintaining at 85° C. or higher. After 10 minutes, since viscosity began to increase, 4 g of an aqueous 5% sodium sulfite solution was added thereby to terminate the polymerization to obtain a stable aqueous copolymer solution having a nonvolatile content of 20.4%, Brookfield viscosity at 25° C. of 12,100 mPa·s and pH4.5. This solution is referred to as a prototype product F-4.

Examples 45, 47 and 48

The polymerization was conducted in the same manner as in Example 42, except that the constituent monomer component, the amount of the crosslinking agent, the amount of the chain transfer agent and the amount of the catalyst were changed as described in Table 13. Thereby, prototype products F-7, F-9 and F-10 were obtained.

Comparative Example 20 (C20)

In a four-necked flask equipped with a stirrer, a thermometer, a reflux condensing tube and a nitrogen gas introducing tube, 378 g of deionized water, 131 g of an aqueous 50% acrylamide solution, 7.86 g of dimethylaminoethyl methacrylate, 2.32 g of maleic acid, 0.9 g of an aqueous 80% acrylic acid solution, 0.05 g of methylenebisacrylamide and 2.4 g of isopropyl alcohol were charged and, after adjusting the pH to 3.5 with an aqueous 15% sulfuric acid solution, a nitrogen gas was introduced thereby to decrease the dissolved oxygen concentration in the reaction system to 2.5 ppm. After heating to 63° C., 3.8 g (0.25% by weight based on the weight of the monomer) of an aqueous 5% ammonium persulfate solution was added and the polymerization was initiated. Heat generation was terminated by heating to 94° C., followed by maintaining at 85° C. or higher for 60 minutes. After cooling, a stable aqueous copolymer solution having a nonvolatile content of 15.3%, Brookfield viscosity at 25° C. of 12,000 mPa·s and pH4.4 was obtained. This solution is referred to as a prototype product f-1.

Comparative Example 21, 22 (C21, C22)

The polymerization was conducted in the same manner as in Comparative Example 20, except that the constituent monomer component, the amount of the crosslinking agent, the amount of the chain transfer agent and the amount of the catalyst were changed as described in Table 13. Thereby, prototype products f-2 and f-3 were obtained.

Comparative Example 23 (C23)

In a four-necked flask equipped with a stirrer, a thermometer, a reflux condensing tube and a nitrogen gas introducing tube, 215 g of deionized water, 133 g of an aqueous 50% acrylamide solution, 3.15 g of dimethylaminoethyl methacrylate, 6.9 g of an aqueous 60% methacryloyloxyethyltrimethylammonium chloride solution, 1.95 g of itaconic acid, 0.9 g of an aqueous 80% acrylic acid solution and 1.0 g of dimethylacrylamide were charged and, after adjusting the pH to 3.5 with an aqueous 15% sulfuric acid solution, a nitrogen gas was introduced thereby to decrease the dissolved oxygen concentration in the reaction system to 3.8 ppm. After heating to 60° C., 5.5 g (0.36% by weight based on the weight of the monomer) of an aqueous 5% ammonium persulfate solution and 2.7 g (0.18% by weight based on the weight of the monomer) of an aqueous 5% sodium sulfite solution were added and the polymerization was initiated. Heat generation was terminated by heating to 94° C. and 2.3 g of (0.15% by weight based on the weight of the monomer) of an aqueous 5% ammonium persulfate solution was continuously added, followed by maintaining at 85° C. or higher. After 5 minutes, since viscosity began to increase rapidly, 6 g of an aqueous 5% sodium sulfite solution was added thereby to terminate the polymerization. After cooling, a stable aqueous copolymer solution having a nonvolatile content of 20.7%, Brookfield viscosity at 25° C. of 17,600 mPa·s and pH4.4 was obtained. This solution is referred to as a prototype product f-4.

Comparative Example 24 (C24)

In a four-necked flask equipped with a stirrer, a thermometer, a reflux condensing tube and a nitrogen gas introducing tube, 175 g of deionized water, 129 g of an aqueous 50% acrylamide solution, 4.27 g of dimethylaminoethyl methacrylate, 14.2g of an aqueous 60% methacryloyloxyethylbenzyldimethylammonium chloride solution, 0.65 g of itaconic acid, 1.0 g of dimethylacrylamide and 0.48 g of sodium methallylsulfonate were charged and, after adjusting the pH to 3.5 with an aqueous 15% sulfuric acid solution, a nitrogen gas was introduced thereby to decrease the dissolved oxygen concentration in the reaction system to 2.8 ppm. After heating to 60° C., 3.3 g (0.2% by weight based on the weight of the monomer) of an aqueous 5% ammonium persulfate solution was added and the polymerization was initiated. After heating to 84° C. over 20 minutes, an aqueous monomer solution comprising 75 g of deionized water and 3.25 g of itaconic acid was added dropwise over 20 minutes, followed by maintaining at 84° C. for 45 minutes. The reaction was terminated by cooling to obtain an aqueous copolymer solution having a nonvolatile content of 20.1%, Brookfield viscosity at 25° C. of 6,700 mPa·s and pH4.3. This solution is referred to as a prototype product f-5. This prototype product was stored in a constant temperature bath at 50° C. for one week and the viscosity was measured. As a result, the viscosity increased to 12,400 mpa·s.

The solid content, the Brookfield viscosity, the weight average molecular weight (Mw) and the molecular weight distribution (Mw/Mn) of the resulting respective prototype products are shown in Table 14. The weight average molecular weight (Mw) and the molecular weight distribution (Mw/Mn) of the respective polymers were decided in the same manner as in "Measurement of molecular weight".

TABLE 13

| No. | Prototype product No. | Step for preparing | Monomer component (mol %) | | | | | | | Crosslinking monomer (mol %) | Chain transfer agent (mol %) | Amount of catalyst (% by weight) | | Dissolved oxygen concentration (ppm) |
|---|---|---|---|---|---|---|---|---|---|---|---|---|---|---|
| | | | AM | DM | DMBC | DMC | AA | IA | MA | MBAM | SMS | APS | Na$_2$SO$_3$ | |
| 39 | F-1 | 1 | 83 | 3 | — | 1 | 2 | — | 1 | 0.02 | 0.22 | 0.1 | 0.02 | 4.0 |
| | | 2 | 10 | — | — | — | — | — | — | — | — | 0.1 | — | |

TABLE 13-continued

| Prototype product No. | No. | Step for preparing | Monomer component (mol %) | | | | | | | Crosslinking monomer (mol %) | Chain transfer agent (mol %) | Amount of catalyst (% by weight) | | Dissolved oxygen concentration (ppm) |
|---|---|---|---|---|---|---|---|---|---|---|---|---|---|---|
| | | | AM | DM | DMBC | DMC | AA | IA | MA | | | APS | Na$_2$SO$_3$ | |
| 40 | F-2 | 1 | 81 | 1 | 6 | — | — | 3 | 1 | 0.03 | 0.18 | 0.06 | — | 3.7 |
| | | 2 | 8 | — | — | — | — | — | — | — | — | 0.1 | — | |
| 41 | F-3 | 1 | 82 | — | 4 | 2 | — | 2 | — | 0.01 | 0.27 | 0.03 | — | 1.4 |
| | | 2 | 10 | — | — | — | — | — | — | — | — | 0.1 | — | |
| 42 | F-4 | 1 | 70 | 1 | 1 | — | — | — | 2 | 0.02 | 0.3 | 0.07 | — | 0.8 |
| | | 2 | 24 | 1 | 1 | — | — | — | — | — | — | 0.05 | — | |
| | | | | | | | | | | VT | TGR | | | |
| 43 | F-5 | 1 | 85 | 2 | 3 | — | 3 | — | — | 1 | 0.3 | 0.1 | 0.03 | 2.6 |
| | | 2 | 7 | — | — | — | — | — | — | — | — | 0.1 | — | |
| 44 | F-6 | 1 | 83 | 7 | — | — | — | 1 | 3 | 1.5 | 0.25 | 0.08 | — | 3.2 |
| | | 2 | 6 | — | — | — | — | — | — | — | — | 0.08 | — | |
| 45 | F-7 | 1 | 72 | — | 1 | 1 | — | 1.5 | — | 1.8 | 0.35 | 0.05 | — | 1.3 |
| | | 2 | 23 | — | 1 | — | — | 0.5 | — | 0.2 | 0.05 | 0.07 | — | |
| | | | | | | | | | | DMAM | SMS | | | |
| 46 | F-8 | 1 | 84 | 3 | — | 1 | 4 | — | — | 0.5 | 0.18 | 0.1 | — | 3.5 |
| | | 2 | 8 | — | — | — | — | — | — | — | — | 0.08 | — | |
| 47 | F-9 | 1 | 68 | 3 | 2 | — | — | 2.5 | — | 1 | 0.3 | 0.07 | — | 2.0 |
| | | 2 | 23 | — | 1 | — | — | 0.5 | — | — | — | 0.1 | — | |
| 48 | F-10 | 1 | 63 | 2 | — | 1 | 1 | 1 | — | 0.8 | 0.35 | 0.05 | — | 2.4 |
| | | 2 | 30.5 | — | — | 1 | — | 0.5 | — | 0.2 | 0.1 | 0.1 | — | |
| | | | | | | | | | | MBAM | IPA | | | |
| C20 | f-1 | — | 92 | 5 | — | — | 1 | — | 2 | 0.03 | 4.0 | 0.45 | — | 2.5 |
| | | | | | | | | | | VT | SMS | | | |
| C21 | f-2 | — | 86 | — | 5 | 3 | 2 | 4 | — | 1 | 0.15 | 0.24 | 0.12 | 4.1 |
| | | | | | | | | | | | SMS | | | |
| C22 | f-3 | — | 93 | 3 | 1 | — | — | 2 | 1 | — | 0.2 | 0.2 | 0.1 | 3.4 |
| | | | | | | | | | | | DMAM | | | |
| C23 | f-4 | 1 | 93.5 | 2 | — | 2 | 1 | 1.5 | — | 1 | — | 0.36 | 0.18 | 3.8 |
| | | 2 | — | — | — | — | — | — | — | — | — | 0.15 | — | |
| | | | | | | | | | | DMAM | SMS | | | |
| C24 | f-5 | 1 | 89 | 3 | 3 | — | — | 0.5 | — | 1 | 0.3 | 0.2 | — | 2.8 |
| | | 2 | — | — | — | — | — | 2.5 | — | — | — | — | — | |

TABLE 14

| No. | Prototype product No. | Solid content (%) | Viscosity (mPa·s) | Mw (×10000) | Distribution (Mw/Mn) |
|---|---|---|---|---|---|
| 39 | F-1 | 15.2 | 3,900 | 228 | 3.7 |
| 40 | F-2 | 15.6 | 8,000 | 238 | 3.6 |
| 41 | F-3 | 15.3 | 5,600 | 302 | 2.9 |
| 42 | F-4 | 20.4 | 12,100 | 247 | 2.8 |
| 43 | F-5 | 15.1 | 6,100 | 270 | 3.8 |
| 44 | F-6 | 15.9 | 7,300 | 213 | 3.3 |
| 45 | F-7 | 20.6 | 10,500 | 325 | 2.7 |
| 46 | F-8 | 15.5 | 4,800 | 332 | 3.6 |
| 47 | F-9 | 20.6 | 7,900 | 289 | 2.8 |
| 48 | F-10 | 20.3 | 6,800 | 263 | 2.6 |
| C20 | f-1 | 15.3 | 10,500 | 169 | 4.9 |
| C21 | f-2 | 15.4 | 15,800 | 97 | 4.0 |
| C22 | f-3 | 15.6 | 5,100 | 118 | 3.9 |
| C23 | f-4 | 20.7 | 17,600 | 166 | 4.7 |
| C24 | f-5 | 20.1 | 6,700 | 184 | 4.4 |

Test Example 2

Using the respective aqueous polymer solution prototype products obtained in the above examples and comparative examples, handmade papers were obtained in the same manner as in Test Example 1, and then a burst index of the resulting handmade papers was measured. The results are shown in Table 15 Table 16.

TABLE 15

| pH 5.5 (Alum = 2%) | | | |
|---|---|---|---|
| | Amount to be added | Burst Index | |
| Prototype product | (%) | (kgf) | Index |
| Blank | — | 1.74 | 100 |
| F-1 | 0.3 | 2.31 | 133 |
| | 0.6 | 2.47 | 142 |
| | 0.9 | 2.68 | 154 |

TABLE 15-continued pH 5.5 (Alum = 2%)

| Prototype product | Amount to be added (%) | Burst Index (kgf) | Index |
|---|---|---|---|
| F-4 | 0.3 | 2.30 | 132 |
|  | 0.6 | 2.50 | 144 |
|  | 0.9 | 2.72 | 156 |
| F-7 | 0.3 | 2.24 | 129 |
|  | 0.6 | 2.53 | 145 |
|  | 0.9 | 2.71 | 156 |
| F-8 | 0.3 | 2.19 | 126 |
|  | 0.6 | 2.43 | 140 |
|  | 0.9 | 2.66 | 153 |
| F-10 | 0.3 | 2.28 | 131 |
|  | 0.6 | 2.53 | 145 |
|  | 0.9 | 2.77 | 159 |
| f-1 | 0.3 | 2.03 | 117 |
|  | 0.6 | 2.25 | 129 |
|  | 0.9 | 2.49 | 143 |
| f-4 | 0.3 | 2.11 | 121 |
|  | 0.6 | 2.32 | 133 |
|  | 0.9 | 2.54 | 146 |

TABLE 16 pH 6.8 (Alum = 0%)

| Prototype product | Amount to be added (%) | Burst Index (kgf) | Index |
|---|---|---|---|
| Blank | — | 1.93 | 100 |
| F-2 | 0.3 | 2.25 | 117 |
|  | 0.6 | 2.44 | 126 |
|  | 0.9 | 2.6 | 135 |
| F-3 | 0.3 | 2.30 | 119 |
|  | 0.6 | 2.49 | 129 |
|  | 0.9 | 2.65 | 137 |
| F-5 | 0.3 | 2.21 | 115 |
|  | 0.6 | 2.43 | 126 |
|  | 0.9 | 2.58 | 134 |
| F-6 | 0.3 | 2.24 | 116 |
|  | 0.6 | 2.47 | 128 |
|  | 0.9 | 2.63 | 136 |
| F-9 | 0.3 | 2.26 | 117 |
|  | 0.6 | 2.49 | 129 |
|  | 0.9 | 2.63 | 136 |
| f-2 | 0.3 | 2.01 | 104 |
|  | 0.6 | 2.18 | 113 |
|  | 0.9 | 2.39 | 124 |
| f-3 | 0.3 | 2.07 | 107 |
|  | 0.6 | 2.21 | 115 |
|  | 0.9 | 2.44 | 126 |
| f-5 | 0.3 | 2.13 | 110 |
|  | 0.6 | 2.31 | 120 |
|  | 0.9 | 2.49 | 129 |

While preferred embodiments of the invention have been described and illustrated above, it should be understood by a person with an ordinary skill in the art that alternatives and modifications can be made without departing from the spirit or scope of the present invention.

What is claimed is:

1. A method for preparing a water soluble polymer, which comprises:
    a first step of polymerizing:
    (a) 60 to 99.5 mol % of at least one monomer selected from the group consisting of acrylamide and methacrylamide,
    (b) 0.5 to 20 mol % of at least one monomer selected from the group consisting of α,β-unsaturated monocarboxylic acid, α,β-unsaturated dicarboxylic acid and salts thereof, and
    (c) 1 to 20 mol % of at least one monomer selected from the group consisting of a water soluble cationic monomer and a salt thereof,
    (d) 0.01 to 1 mol % of a chain transfer agent, and
    (e) 0.005 to 5 mol % of a crosslinkable monomer,
    in the presence of a persulfate-based catalyst to obtain a prepolymer, and
    a second step of further adding 6-40 mol % copolymerizable monomers and the persulfate-based catalyst after the polymerization of the first step, followed by the polymerization and termination of the polymerization;
    wherein the amount of the persulfate-based catalyst to be added in the first step is from 0.01 to 0.08% by weight based on the total amount of all the monomers;
    the amount of the persulfate-based catalyst added in the second step is from 0.01 to 0.1 by weight based on the total amount of all the monomers and the persulfate-based catalyst in the second stage is charged after 20 minutes or more have passed since the addition of the copolymerizable monomers; and
    the molecular weight distribution (Mw/Mn) of the water soluable polymer is 3.3 or less.

2. The method according to claim 1, wherein the crosslinkable monomer (e) is at least one selected from the group consisting of
    (e-1) 0.1 to 5 mol % of a monomer having an active site capable of serving as a crosslinking agent, and
    (e-2) 0.005 to 0.3 mol % of a crosslinkable monomer having plural vinyl groups.

3. The method according to claim 2, wherein the monomer (e-1) having an active site capable of serving as a crosslinking agent is vinyltoluene or dimethylacrylamide.

4. The method according to claim 1, wherein the chain transfer agent (d) is at least one selected from the group consisting of an allyl group-containing compound, a methallyl group-containing compound and a mercapto group-containing compound.

5. The method according to claim 1, wherein the polymerization is conducted under the conditions where the dissolved oxygen concentration is adjusted to 3 ppm or less using an inert gas in the first step.

6. The method according to claim 1, wherein, as the initial catalyst used in the first step, a persulfate-based catalyst is used alone or the persulfate-based catalyst is used in combination with a reducing agent so that a weight ratio of the reducing agent to the persulfate-based catalyst is 1/3 or less.

7. The method according to claim 1, wherein at least one of a reducing agent or a polymerization inhibitor is added as a terminator for terminating the crosslinking reaction and a terminator for terminating the polymerization in the second step.

8. The method according to claim 7, wherein the amount of the terminator to be added is 0.25 to 4 times larger than the weight of the additional catalyst.

9. The method according to claim 1, wherein sodium sulfite or sodium hydrogensulfite is used as a terminator for terminating the polymerization in the second step.

10. The method according to claim 1, wherein the catalyst used in the second step is added by a single or plural portions.

11. The method according to claim 1, wherein the polymerization temperature is maintained at 70° C. or higher in the second step.

12. A papermaking additive comprising the water soluble polymer obtained by the method according to claim 1.

* * * * *